June 9, 1964     C. A. RAU ETAL     3,136,371
TRACTOR ARRANGEMENT
Filed Aug. 26, 1960     4 Sheets-Sheet 1
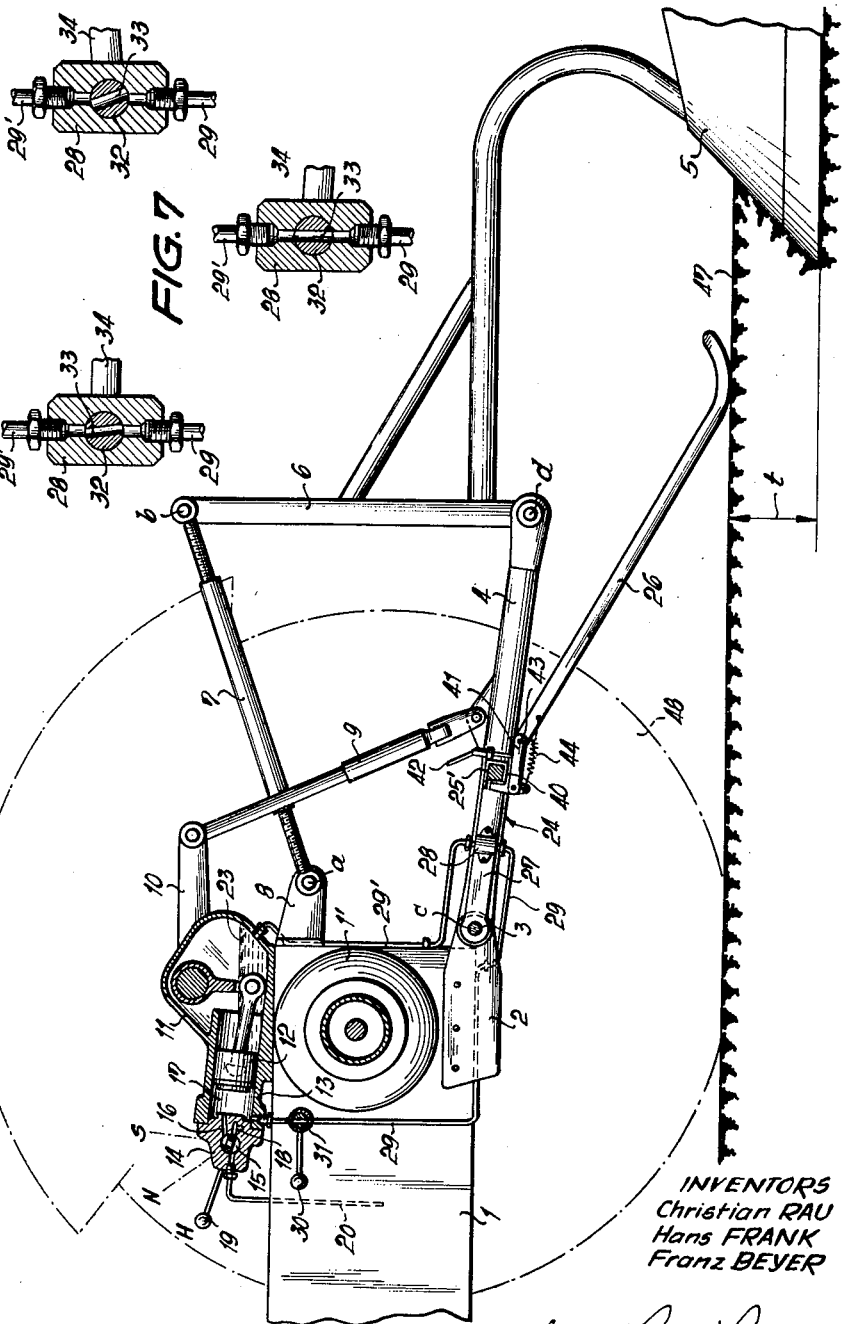
INVENTORS
Christian RAU
Hans FRANK
Franz BEYER
BY Dicke, Craig & Freudenberg
ATTORNEYS

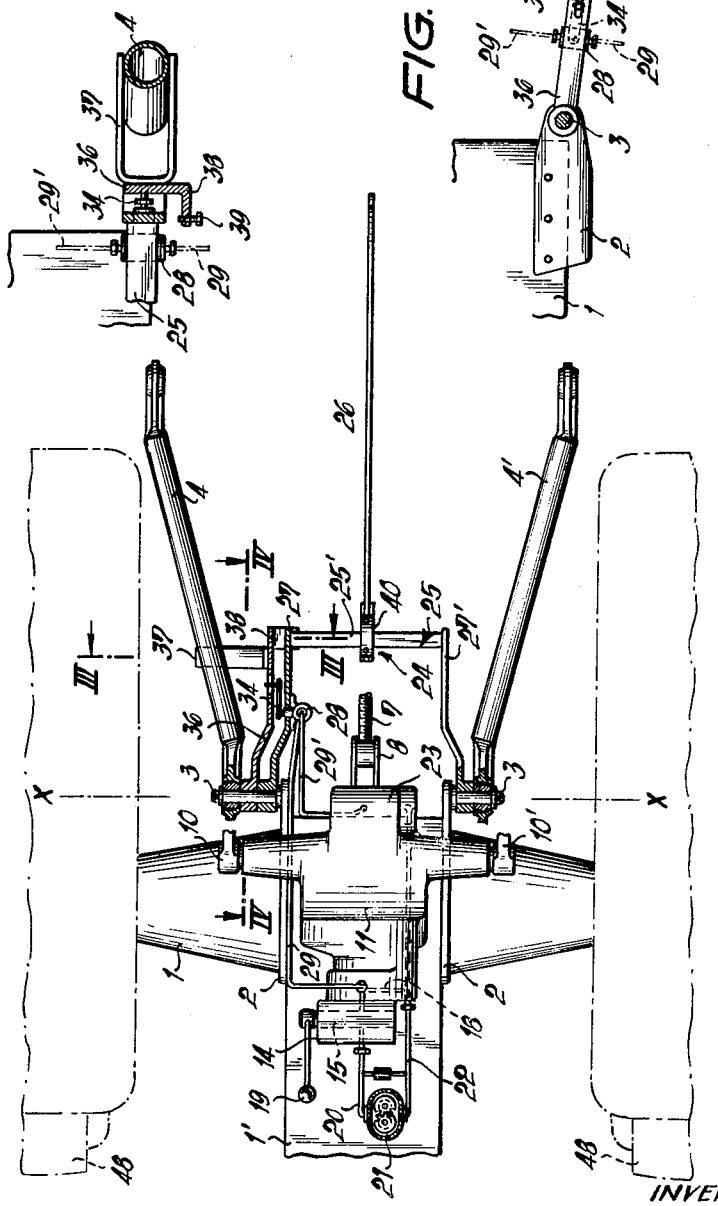

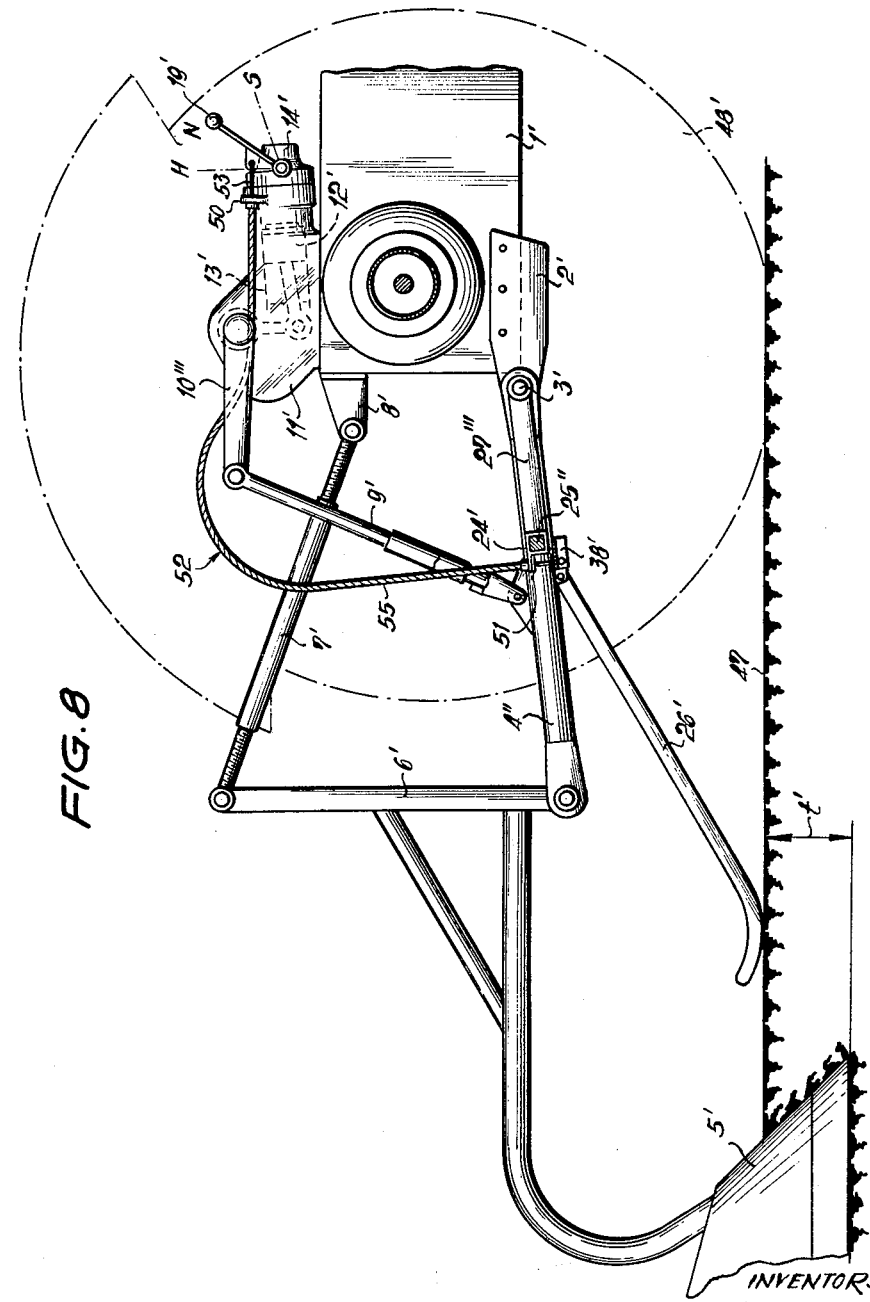

June 9, 1964 C. A. RAU ETAL 3,136,371
TRACTOR ARRANGEMENT
Filed Aug. 26, 1960 4 Sheets-Sheet 4
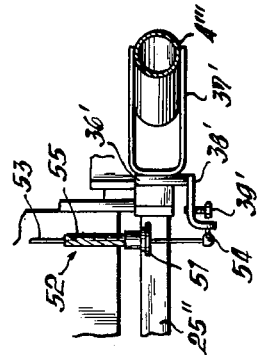
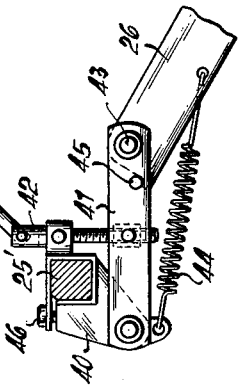
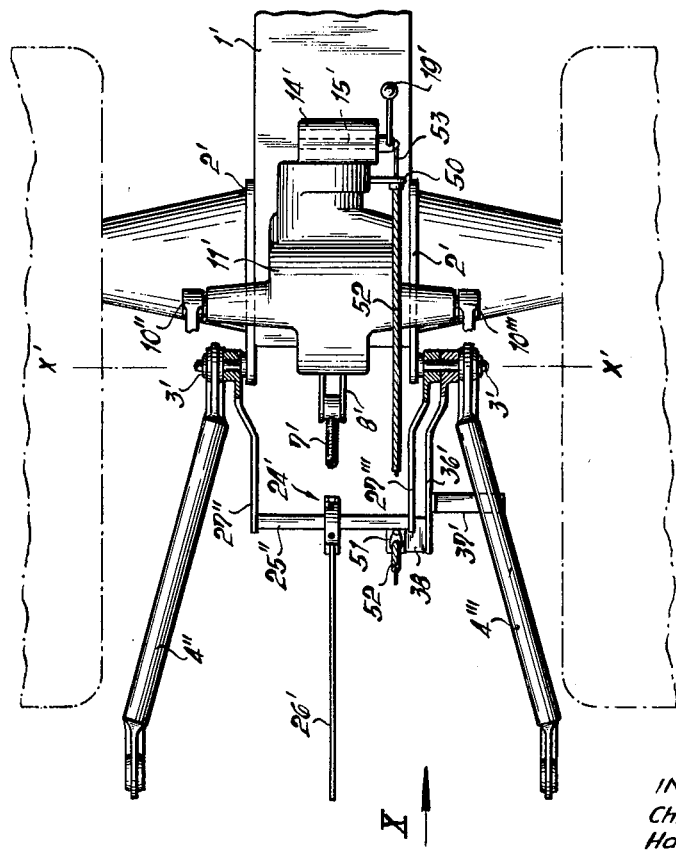
INVENTORS
Christian RAU
Hans FRANK
Franz BEYER
BY Dicke, Craig & Freudenberg
ATTORNEYS United States Patent Office 3,136,371
Patented June 9, 1964

3,136,371
TRACTOR ARRANGEMENT
Christian Alfons Rau, Kirchheim unter Teck, Hans Frank, Friedrichshafen am Bodensee, and Franz Bayer, Friedrichshafen-Fischbach, Germany, assignors to Firma Porsche-Diesel-Motorenbau G.m.b.H., Friedrichshafen am Bodensee, Germany
Filed Aug. 26, 1960, Ser. No. 52,243
Claims priority, application Germany Sept. 5, 1959
30 Claims. (Cl. 172—4)

The present invention relates to an arrangement for the automatic depth control of farming implements operatively connected with a tractor by means of a four-cornered guide linkage which is provided with a sensing device operatively interconnected into the hydraulic installation of the tractor.

Constructions are known in the prior art in which the sensing device which is operatively connected with the attached implement by means of a guide-arm parallelogram acts on a control valve which is included within the hydraulic installation of the tractor as an independent component part. This arrangement, however, entails the disadvantage that each implement to be installed has to be provided with its own sensing control which results in a high purchase price. To this have to be added the expenditures for the automatic control circuit whereby the hydraulic installation of such prior art construction is considerably increased in cost thereof.

Constructions are also known in the prior art in which the sensing device is pivotally connected at the tractor drive unit by a connection with one of the lower guide members of the quadrilateral linkage or by means of pivot pins disposed below the pivotal connection of the lower guide member. These prior art arrangements are adequate as long as plane or even surfaces are to be worked with the tractor. However, if as is the rule normally, surface unevennesses are present in the ground to be worked, then the prior art arrangements do not operate any longer with the required accuracy. This may be traced back to the fact that the tractor inclines or tilts forwardly or rearwardly while passing over ground obstructions or unevennesses with the result that the selected pivot point of the sensing device assumes a position different from the initial position thereof with respect to the pivot points of the quadrilateral linkage. Angular changes about the vertical axis of the tractor take place therefore between the sensing device and the transmission linkage thereof whereby the control valve is adjusted in such a manner that with an inclination or tilting of the tractor, for example, forwardly, the working depth is increased, in an undesired manner, by an amount corresponding to the extent of the angular change. If the tractor, for example, while leaving a depression or hole, tilts rearwardly, then the working implement is further retracted or pulled-in by an amount corresponding to the angular change whereby the working depth becomes correspondingly smaller. The same is also true in the reverse order for a sensing device operating exclusively mechanically in which the effective length of the upper guide member is increased or decreased in dependence on a sensing roller pivotally connected adjacent to the lower guide member. The angle of attack of the attached implements is thereby forcibly changed whereby for uneven working areas the fuel consumption and required output of the tractor is increased in an uneconomic manner.

According to the present invention, these disadvantages are avoided by the fact that the sensing device of the installation is pivotally connected to a bow-shaped or stirrup-type member which is connected with the tractor coaxially to the pivot axis of the lower guide member of the four-cornered linkage. As a result thereof, an unobjectionable, completely satisfactory installation of the sensing arrangement, independent of the position of the tractor, is achieved in which no angular changes are noted in the transmission of the actuating impulse to the control installation of the hydraulic mechanism. The swinging movements of the four-cornered or quadrilateral linkage transversely to the tractor longitudinal axis thereby have no effect on the sensing arrangement so that the relative movement between the sensing device and the four-cornered linkage represents an absolute measure for the working-depth changes. A particularly favorable arrangement results by arranging the angularly bent leg portions of the bow-shaped member opposite the tractor drive unit and by rotatably retaining each leg portion of the tractor coaxially to the axis of the lower guide member of the four-cornered linkage. This construction assures a support basis sufficient for the high requirements without crowding the installation or attachment of the implement at the tractor.

Advantageously, an adjusting member is operatively connected with one of the guide members of the four-cornered linkage which adjusting member transmits the relative movement between the sensing device and the guide member as measuring magnitude of the working depth to a control valve regulating or controlling the power lift. A simple connection between the sensing arrangement and the working implement is created thereby which operates uninfluenced by swinging movements of the tractor resulting from ground unevennesses or the like. The adjusting member is formed by a drag-lever operatively connected with one of the lower guide members which is pivotally supported coaxially to the pivot axis of the lower guide member and which extends between the guide member and a leg portion of the bow-shaped member of the sensing arrangement. As a result thereof, a spatially favorable arrangement is achieved with relatively low expenditures without constricting the pivot range of the four-cornered linkage. An installation for transmitting the relative movement which is operatively connected with the bow-shaped member and which is controlled in dependence on the sensing arrangement is pivotally connected in an advantageous manner at the drag-lever. Additionally, the drag-lever is provided with an abutment, preferably with an adjustable abutment which serves as entrainment member during lifting or withdrawal of the attached implement, for example, into the transport position thereof. The sensing arrangement is simultaneously moved out of the operating position thereof by the abutment.

The transmission installation consists preferably of a throttle valve included in a pressure line between the cylinder of the power lifter and the reservoir whereby the adjusting linkage of the throttle valve is operatively connected with the drag-lever. Depending on the adjustment of the throttle valve controlled by the position of the sensing member, a more or less large pressure is produced within the working cylinder of the power lifter under the effects of which the implement is lifted or further lowered. The selected manner of the transmission of the actuating impulse may be realized with few additional structural parts and operates so effectively that, for example, the relatively slight working depth required during peeling may be maintained constant over any unevenly formed surfaces of any desired length. The throttle valve is formed preferably by a rotary slide valve which is pivoted directly at one of the leg portions of the bow-shaped member. This construction and the arrangement of the throttle valve offers the advantages of an exact and accurate detection of the measuring magnitude produced by the sensing member and of a servicefree construction. A shifting valve provided with a shifting lever is inserted into the pressure line between the cylinder of the power lifter and the reservoir, ahead of the throttle valve, by means of which the supply of pressure medium to the throttle valve takes place selectively in dependence on the position of the control slide valve of the hydraulic installation. The shifting valve is preferably constructed as a pressure-limit valve adjustable to different pressures which produces within the cylinder space of the power lifter a counter pressure lying below the lifting force required for lifting of the attached implements. As a result thereof, a part of the weight of the attached implement may be transmitted to the tractor independently of the sensing arrangement which is desirable for purposes of increasing the traction with a more or less strongly changing density or firmness of the soil.

The transmission installation may also consist of a pull wire or draw cable the sleeve of which is secured between a stationary abutment and the bow-shaped member of the sensing device and the pull member of which is pivotally secured at the drag-lever or at the shifting lever of the hydraulic installation. This installation acts directly on the shifting lever operatively connected with the control slide valve of the hydraulic power lift installation and as a result thereof may be realized with few simple means. This installation is particularly suited for depth controls in connection with operations in which the depth may deviate by a slight amount, for example, plus or minus 10% in the upward or downward direction.

The readily detachable sensing member formed by a skid or guide member is displaceably secured at the bow-shaped member by means of a clamping member and is also pivotally secured at the bow-shaped member of the sensing arrangement so as to be adjustable in its height. As a result thereof, the sensing arrangement may be used with great versatility and may remain at the tractor after removal of the guide member or sensing arm without impairing the remainder of the attachment installation. The skid-like guide member or sensing arm is thereby preferably pivotally supported about a bearing bolt member and is tensioned under the effect of a return spring against an abutment. This produces an overload safeguard for the hydraulic installation which becomes effective only when the guide member or sensing arm abuts suddenly against a larger resistance, for example, against a rim edge or the like. The sensing device is thereby pivoted upwardly about the pivot bolt without influencing the hydraulic installation of the power lifter.

Accordingly, it is an object of the present invention to provide a depth control installation for tractors which avoids the shortcomings and inadequacies of the prior art constructions.

It is another object of the present invention to provide a depth control arrangement for tractors that may be readily interconnected into the hydraulic system of the tractor, which is simple and reliable in operation, and which is relatively inexpensive.

A still further object of the present invention resides in the provision of a depth control arrangement for a tractor operative to control the depth of the working implements attached to the tractor which operates accurately while remaining essentially uninfluenced by tilting or rolling of the tractor during operation thereof.

Still another object of the present invention resides in the provision of a depth control installation for tractors to control the depth of the farming implement attached thereto which assures high accuracy in the depth control notwithstanding large unevenesses in the ground to be worked.

Another object of the present invention resides in the provision of a depth control mechanism which offers great versatility, not only in its adaptation to different operating conditions, but also in the control possibilities thereof which are extremely simple and easy to manipulate.

These and other objects features and advantages of the present invention will become more obvious from the following description when taken in connection with the accompanying drawing which shows, for purposes of illustration only, two embodiments in accordance with the present invention and wherein:

FIGURE 1 is a side elevational view, partly in cross-section, of the rear portion of a first embodiment of an agricultural tractor with a plow attached in the working position thereof and with a sensing arrangement in accordance with the present invention, FIGURE 2 is a plan view of the tractor and sensing arrangement according to FIGURE 1, again partly in cross-section to indicate some details thereof, FIGURE 3 is a cross-sectional view, on an enlarged scale, taken along line III—III of FIGURE 2, FIGURE 4 is a cross-sectional view, on an enlarged scale, taken along line IV—IV of FIGURE 2, FIGURES 5 through 7 are partial longitudinal cross-sectional views through the throttle valve, on an enlarged scale, showing the same in different operating positions, FIGURE 8 is a side elevational view of the rear portion of a modified embodiment of a tractor provided with a sensing device for the attached working implement in which the sensing member acts on the power lift installation through a Bowden cable, FIGURE 9 is a plan view of the sensing arrangement and the tractor according to FIGURE 8, partly in cross-section to show some details thereof, FIGURE 10 is a partial view of the details of the sensing arrangement, on an enlarged scale, taken in the direction of the arrow X in FIGURE 9, and FIGURE 11 is a side elevational view, on an enlarged scale, of the pivotal connection of the skid or guide member at the bow-shaped member of the sensing arrangement.

Referring now to the drawing wherein like reference numerals are used throughout the various views to designate corresponding parts, and more particularly to FIGURES 1 and 2, reference numeral 1 designates therein a tractor which is provided with suitable supports or brackets 2 arranged at both longitudinal sides thereof. Bearing pins 3 are secured within the support members 2. The bearing pins 3 serve for the pivotal accommodation of the lower guide members 4 and 4' of the suspension of the attached plow 5, the plow head-piece 6 of which is connected with the upper guide member 7 (FIGURE 1). The upper guide member 7 which is secured within a bearing lug or bearing bracket 8 connected with the tractor drive unit 1' forms together with the lower guide members 4 and 4' a four-cornered or quadrilateral guide linkage which is characterized by the pivot points $a$, $b$, $c$, $d$ (FIGURE 1). The lower guide members 4 and 4' are pivotally connected by means of struts 9 with the lift arms 10 and 10' of the power lifter 11. The piston 12 of the power lifter 11 slides within a cylinder 13 which is closed off by means of a control head-piece 14. The control head-piece 14 contains a rotary valve 15 by means of which the line 16 for the supply of the pressure medium into the cylinder space 17 or a discharge line 18 is adapted to be controlled with the aid of a selecting lever 19. The supply of pressure medium takes place through a line 20 which is operatively connected, as indicated in FIGURE 2, with the supply pump 21 of any suitable construction. The suction line 22 of the supply pump 21 terminates in the reservoir which is formed by a space 23 of the power lifter 11. Operating positions N, H and S (FIGURE 1) corresponding to the neutral, lifting and lowering positions, respectively, are coordinated to the selecting lever 19 of the power lift 11.

A sensing arrangement generally designated by reference numeral 24 is arranged coaxially to the pivot axis $x$—$x$ of the lower guide members 4 and 4' of the four-cornered linkage a, b, c and d which essentially consists of a bow-shaped, clevis-type member generally designated by reference numeral 25 (FIGURE 2) to which is secured a skid-like guide member or sensing arm 26. The bow-shaped member 25 is constructed of essentially U-shape and includes two leg portions 27 and 27' opposite the tractor drive unit 1' which are pivotally supported about pivot pins 3 independently of the guide members 4 and 4'. A throttle valve 28 is secured at the inner side of the leg portion 27 which is interconnected into a pressure line 29, 29' disposed between the cylinder space 17 of the power lift 11 and the reservoir 23. A shifting member 30 (FIGURE 1) for a control valve 31 is arranged in the pressure line 29, ahead of the throttle valve 28, which serves, inter alia, as a pressure limit valve adjustable to different pressures. For that purpose, the shifting member 30 is provided or operatively connected with a valve 31 by means of which the cross-sectional flow aperture of the pressure line 29 may be increased or reduced. The pressure lines 29 and 29' are constructed as flexible connections within the area between the throttle valve 31 and the tractor drive unit 1'. The selecting lever 19 as well as the shifting lever 30 are arranged so as to be within easy reach from the driver seat of the tractor.

The throttle valve 28 also contains a rotary slide valve member 32 (FIGURES 5 through 7) provided with a bore 33 by means of which the cross-sectional flow aperture from the pressure line 29 to the line section 29' may be selectively throttled or opened. The adjusting linkage 34 (FIGURES 2 and 4) of the throttle valve 28 engages into an elongated aperture 35 (FIGURE 4) of a drag-lever 36 which extends between the lower guide member 4 and the leg portion 27 of the bow-shaped member 25 (FIGURE 2). The drag-lever 36 is also rotatably supported on the bearing pin 3 coaxially of the rotary axis x—x and includes a fork portion 37 (FIGURE 3) which partly surrounds the lower guide member 4. The free end of the drag-lever 36 is provided with an angularly-bent web portion 38 which carries an adjustable abutment formed by a screw or bolt 39 (FIGURE 3).

The cross member 25' of the bow-shaped member 25 is constructed as profile piece on which a clamping piece 40 (FIGURES 1 and 11) is arranged to be adjustably displaced. The clamping piece 40 is provided with a support member 41 which is retained by means of a spindle 42 so as to be selectively adjustable with respect to the bow-shaped member 25. The skid-like guide member or sensing arm 26 is pivotally supported at the support member 41 about a bearing bolt 43 and is held against an abutment bolt 45 by means of a return spring 44. The clamping piece 40 is tightened in the desired position thereof at the cross piece 25' of the bow-shaped member 25 by means of a screw or bolt 46.

For purposes of setting the sensing arrangement 24 into operation, the attached plow 5 is lowered with the aid of the power lifter 11 and is adjusted to the desired depth t by lengthening or shortening of the upper guide member 7 of the four-cornered linkage a, b, c, and d. Thereupon the guide member or sensing arm 26 is adjusted with the aid of the spindle 42 in such a manner that it comes into abutment against the surface 47. Furthermore, the initially closed shifting member 30 has to be opened, and the selecting lever 19 of the power lift 11 has to be displaced from the neutral position N thereof into the position H corresponding to "lifting."

The pressure oil supplied by the pump 21 thereby flows in the aforementioned position of selecting lever 19 through the control valve 15 and through the line 16 within the control head-piece 14 into the cylinder space 17 of the power lift 11. By reason of the open communication existing in the direction of the shifting lever 30 and valve 31, the pressure oil cannot load the working piston 12 and instead flows off through the line 29 toward the throttle valve 28. In the working or operating position illustrated in FIGURE 1, the guide member or sensing arm 26 rests on an even surface whereby the pressure oil may flow through the bore 33 in the rotary control valve member 32 (FIGURE 5) of the throttle valve 28 in an essentially unthrottled manner, and flows off through the line section 29' into the sump or reservoir 23. The oil is again returned from the reservoir 23 by the pump 21 through the suction line 22 to the control circulatory system.

If the guide member 26 encounters a soil elevation in the ground while the tractor passes over the field to be worked, then the guide member or sensing arm 26 moves upwardly and pivots the bow-shaped member 25 about the axis x—x. A relative movement between the bow shaped member 25 and the drag-lever 36 takes place thereby so that the adjusting linkage 34 of the throttle valve 28 is swung through a corresponding angular magnitude resulting therefrom. If the guide member or sensing arm 26 moves upwardly, this pivotal or swinging movement has as consequence an adjustment of the rotary valve member 32 to a position thereof in which it impedes the free passage of the pressure oil from the line 29 to the line section 29'. As a result thereof, a pressure head builds up which continues into the cylinder space 17 of the power lift 11 and under the effect of which the working piston 12 is moved toward the right as viewed in FIGURE 1. As a result of such movement of the working piston 12, the lower guide members 4 and 4' of the four-cornered guide linkage together with the plow 5 are lifted by means of struts 9 interconnected with the working piston 12 by the bellcrank-type connection 10. This lifting movement continues for such length of time until the drag-lever 36 operatively connected with the fork portion 37 thereof with the guide member 4 again returns to the initial position thereof with respect to the bow-shaped member 25 of the sensing arrangement 24. The adjusting linkage 34 is thereby positively readjusted in a continuous stepless manner to such an extent until it reassumes its initial position (FIGURE 5) with the result that the pressure head is again being reduced. The plow 5 now operates again with the same working depth t in another plane. The working depth thereby remains constant over the entire operating range, independently of the position the tractor assumes with respect to the implement suspension.

If the guide member 26 moves into a depression, then the bow-shaped member 25 follows correspondingly. The relative movement between the bow-shaped member 25 and the drag-lever 36 effects an adjustment of the rotary valve member 32 of the throttle valve 28 in the sense of opening the throttling place (FIGURE 7) between the lines 29 and 29'. As a result thereof, the discharge of pressure oil into the reservoir 23 becomes completely free so that the relieved working piston 12 is moved correspondingly toward the left as viewed in FIGURE 1 and thereby lowers the plow 5 correspondingly to a greater depth. This operation repeats itself automatically as long as the shifting member 30 remains opened.

At the end of a drawn furrow, the shifting member 30 is manually closed by the operator. Since the selecting lever 19 is in the position H corresponding to "lifting," the full pressure now becomes effective within the cylinder space 17 whereby the plow 5 is lifted. The sensing arrangement 24 is also lifted simultaneously by the abutment 39 (FIGURE 3). After turning of the tractor, the shifting member 30 is reopened whereupon the plow 5 together with the sensing arrangement 24 returns into the working position thereof. The operating interplay of the guide member or sensing arm 26 now repeats itself in the manner described hereinabove.

Since the lifting and reinsertion of the attached implement as well as the operation of the sensing arrangement may be carried out by a single shifting member, an installation is produced thereby extraordinarily fit for its intended operation and imposing only relatively low demands on the farmer. Added to this is the fact that the shifting member, i.e., in the illustrated embodiment the shifting valve 30, 31 simultaneously serves as pressure-limit valve by means of which a part of the weight of the attached implement can be transmitted to the tractor if the ground or soil conditions should require the same. For that purpose, the shifting member 30, in contrast to the illustration of FIGURE 1, showing the same completely opened, is only partly opened with the aid of the rotary valve member 31 the partly opened positions of which might be indicated or marked by notches or the like. As a result thereof, there is established within the cylinder space 17 of the power lift 11 a counterpressure which has to be selected of such magnitude that it is still below the force necessary to lift the plow 5. The rear wheels 48 of the tractor 1 are thereby additionally loaded by such manipulation and, therefor, no longer can slip. The excess pressure valve 31 has no influence no the operation of the sensing arrangement 24 and the throttle valve 28 thereof. The only difference resides in the fact that the hydraulic installation operates at a different pressure level.

If, in the place of the illustrated bed-plow, rotary- or disk-plows are provided, then, if this should become necessary, the guide member or sensing arm 26 may be arranged laterally displaced in either direction from the tractor longitudinal axis (FIGURE 2) without in any way impairing the operation and effectiveness of the installation. For that purpose, it is only necessary to loosen the screw 46 of the clamping piece 40 (FIGURE 11) whereupon the support 41 for the sensing arm or guide member 26 can be displaced axially of the cross member 25' and may be clamped again at any suitable place. If the guide member or sensing arm 26, as a result of an unexperienced manipulation of the sensing arrangement 24, abuts or impinges against a rim edge, a larger stone or the like, then the guide member or sensing arm 26 deflects upwardly rearwardly about the bolt member 43 as its pivot point against the force of spring 44 without substantially influencing the bow-shaped member 25. There are prevented thereby sudden pressure increases in the hydraulic installation which might cause damage thereto. If the sensing arrangement 24 is not needed, then only the bolt member 43 has to be partly removed and the spring 44 has to be unhooked from the clamping piece 40 whereupon the guide member or sensing arm 26 may be removed. The bow-shaped member 25 and the drag-lever 36, however, remain at the tractor without impairing the attachment of implements for other operations.

FIGURES 8 to 10 illustrate a simplified embodiment with an essentially identical basic construction of the sensing arrangement in which the sensing movements of the sensing arm or guide member are transmitted to the selecting lever of the hydraulic installation by means of a pull cable. The same parts are designated again in the drawing by similar though primed reference numerals.

Support members 2' are again arranged on both longitudinal sides of the tractor on which are secured the bearing pins 3'. The bearing pins 3' serve for the pivotal accommodation of the lower guide members 4" and 4''', of the pivotal suspension of the attached plow 5', the plow head-piece 6' of which is operatively connected with the upper guide member 7'. The upper guide member 7' which is secured at a bearing lug or bracket 8' forms again together with the lower guide members 4" and 4''' a four-cornered guide linkage. The lower guide members 4" and 4''' are pivotally connected through struts 9' with the lift arms 10" and 10''' of the power lifter 11'. The piston 12' of the power lift 11' slides within a working cylinder 13' which carries a control head-piece 14'. The control end piece 14' contains a rotary valve 15' which is operatively connected with the selecting lever 19'. The supply of pressure medium and the control of the hydraulic installation takes place in the same manner as with the first embodiment with the difference that the operating positions H, N, S for the lifting and lowering of the attachments are interchanged. The neutral position N again is disposed between the two aforementioned end positions H and S.

A sensing arrangement generally designated by reference numeral 24' is arranged coaxially to the rotary axis $x'$—$x'$ of the lower guide members 4" and 4''' which again consists of a bow-shaped clevis-type members 25" at which a guide member or sensing arm 26' is pivotally secured. The bow-shaped member 25" is constructed essentially of U-shape and includes two leg portions 27" and 27''' opposite the tractor drive unit 1' which are pivotally supported about the bearing pins 3' independently of the guide members 4" and 4'''. A drag-lever 36' is disposed between the leg portion 27''' and the guide member 4'''. The drag-lever 36' is also rotatably supported coaxially about the rotary axis $x'$—$x'$ on the bearing pin 3' and includes a fork portion 37' (FIGURE 9) which surrounds partly the lower guide member 4'''. The free end of the drag-lever 36' is provided with an angularly-bent web portions 38' which carries an adjustable abutment formed by a screw or bolt 39'. A pull cable or Bowden cable 52 is secured between an abutment 50 at the power lift 11' and a support 51 at the bow-shaped member 25" the pull member 53 of which is operatively connected at one end thereof with the selecting lever 19'. The opposite end of the pull member 53 is operatively connected by means of a ball head 54 (FIGURE 10) with the angularly-bent web portion 38' of the drag-lever 36'. The support of the guide member or sensing arm 26' on the bow-shaped member 25" of the sensing arrangement 24' is clearly visible from FIGURE 11. The accommodation of the sensing arm or guide member 26 illustrated in this figure is suitable for both embodiments disclosed herein.

For purposes of setting into operation the sensing arrangement 24', the plow 5' is lowered with the aid of the power lifter 11' and again is adjusted, as in the first embodiment, described hereinabove, to the desired depth $t'$ by shortening or lengthening the upper guide member 7'. By the same token, the position of the sensing arm or guide member 26' is adjusted with the aid of spindle 42 (FIGURE 11) to the surface 47' corresponding to existing conditions. The selecting lever 19' of the power lift 11', in contrast to the first embodiment described hereinabove, is in a neutral position in which the plow may freely operate.

If the sensing arm or guide member 26' encounters a bulge or elevation while traveling over the field, then the bow-shaped member 25" pivots upwardly about the axis $x'$—$x'$ whereby the sleeve 55 of the pull cable 52 is forcibly bent or bulged in the same direction. Since the position of the drag-lever 36' is given by the position of the lower guide member 4''', the pull member 53 is pulled into the sleeve 55 at the force-producing end thereof and thereby adjusts the selecting lever 19' to the "lifting" position thereof. The plow 5' is now lifted by the resulting loading of the working piston 12', and more particularly to such an extent until the drag-lever 36' operatively connected with the lower guide member 4''' returns the pull member 53 to the initially adjusted position thereof. By returning the pull member 53 to the original position thereof, the selecting lever 19' is again pushed back into the neutral position thereof. A predetermined position of the working piston 12', i.e., a predetermined pressure level is thereby coordinated to each position of the sensing arm or guide member 26' so that, irrespective of the contour of the raised portion, a continuously constant working depth $t'$ is assured. The same operation is also established in reverse sequence if the sensing arm or guide member 26' enters a depression. In that case, the pull member 53 adjusts the selecting lever 19' to the "lowering" position S thereof whereby the guide members 4" and 4''' are correspondingly readjusted and the plow 5' is lowered further. Any over- or undercutting of the drawn furrow cannot take place thereby. The abutment 39' limits the angle of swinging movement of the bow-shaped member 25' in the downward direction so that beyond a predetermined depth no relative movement can take place between the bow-shaped member 25" and the drag-lever 36'. This arrangement prevents the pull member 53 is exposed to excessive loads. The abutment 39' further effects the entrainment of the bow-shaped member 25" in the upward direction when the attached implement is brought, for example, into the transport position thereof.

While we have shown and described two embodiments in accordance with the present invention, it is understood that the same is not limited thereto, but is susceptible of many changes and modifications within the spirit and scope thereof. For example, the sensing arrangement in accordance with the present invention may also be provided with differently formed bow-shaped members with the proviso that the pivotal connection at the tractor takes place axially of the rotary axis of the lower guide members of the four-cornered guide linkage. In place of the used sensing arm or skid, a sensing wheel or the like may also be provided. Additionally, it is also within the purview of the present invention to pivotaly connect a fork-shaped sensing arm at the bow-shaped member of the sensing arrangement whereby the measured value or sensed magnitude for the depth control of the installation is taken off a larger basis.

Thus, it is quite obvious that the present invention is not limited to the details shown and described herein, but is susceptible of many changes and modifications without departing from the spirit and scope thereof and we, therefore, do not wish to be limited to the details shown and described herein, but intend to cover all such changes and modifications as are encompassed by the scope of the appended claims.

We claim:

1. An installation for the automatic depth control of working implements operatively connected with a tractor by means of a four-cornered guide linkage, comprising hydraulic means in said tractor including a sump power lift means having a cylinder and adapted to selectively raise and lower the attached implement, and line means forming a circulatory system from said sump to said cylinder and back to said sump, and provided with control valve means, sensing means for sensing the surface passed over by said tractor, said four-cornered guide linkage having a plurality of guide means including lower guide means provided with a pivot axis, pivot means on said tractor coaxial with said axis, connecting means including an approximately bow-shaped member operatively connecting said sensing means for turning movement relatively to said tractor about an extension of said axis, said sensing means being mounted on said bow-shaped member, said bow-shaped member being pivotally mounted on said pivot means, and adjusting means including transmitting means operatively connected with said sensing means and one of said guide means for effectively transmitting control effects representing relative movements between said one guide means and said sensing means to said control valve means for transmitting a controlling movement to said control valve means such as to maintain the working depth of said implement in response to relative movement between said one of said guide means and said sensing means, said relative movement representing measured magnitude of said working depth.

2. An installation for the automatic depth control according to claim 1, wherein said control valve means effectively forms a throttle valve, and wherein said transmitting means includes a linkage operatively connected with a lever forming part of said adjusting means.

3. An installation for the automatic depth control according to claim 2, wherein said throttle valve is constituted by a rotary valve pivotally secured directly at one of the leg portions of said bow-shaped member.

4. An installation for the automatic depth control according to claim 2, further comprising shifting valve means in said line means between said cylinder means and said reservoir ahead of said throttle valve for selectively controlling the supply of pressure medium to said throttle valve in dependence of the selected position thereof.

5. An installation for the automatic depth control according to claim 4, wherein said shifting means is a pressure-limit valve adapted to be adjusted to different pressures which produces within the cylinder space of said cylinder means a counterpressure lying below the lifting force required to lift the attached implement.

6. An installation for the automatic depth control according to claim 1, wherein said tractor is provided with a stationary abutment, and wherein said hydraulic means is provided with lever means, said transmitting means including a pull cable assembly having a sleeve portion secured between said abutment and said bow-shaped member, and a pull member pivotally secured at said lever.

7. An installation for the automatic depth control according to claim 1, wherein said sensing means includes a skid-like sensing member, and clamping means for detachably clamping said sensing member at said bow-shaped member to enable displacement thereof as well as adjustment in the height thereof.

8. An installation for the automatic depth control according to claim 7, wherein said sensing member is pivotally supported about a pivot bearing member mounted on said bow-shaped member and is tensioned against an abutment on said bearing member under the influence of a return spring.

9. An installation for the automatic depth control of working implements operatively connected with a tractor by means of a quadrilateral guide linkage, comprising hydraulic means in said tractor adapted to selectively raise and lower the attached implements including power lift means having a control valve, sensing means operatively connected with said hydraulic means to selectively render the same operative to raise or lower the attached implement, said quadrilateral guide linkage including lower guide means having a pivot axis, connecting means including approximately bow-shaped means for operatively connecting said sensing means with said tractor coaxially to said axis, and adjusting means operatively connected with one of said guide means of said quadrilateral guide linkage transmitting the relative movement between said sensing means and said last-mentioned guide means to said control valve for controlling raising and lowering movements of said implement in directions such as to maintain said depth control in response to said relative movement, said relative movement representing measured magnitude of the working depth, said adjusting means including a drag lever operatively connected with one of said lower guide means, said drag lever being rotatably supported axially of the pivot axis of said lower guide means and extending between said last-mentioned guide means and a leg portion constituted by said bow-shaped means.

10. An installation for the automatic depth control of implements operatively connected with a tractor by means of a four-cornered guide link system, said tractor having a hydraulic means for moving the implement vertically for depth control comprising sensing means operatively connected with the hydraulic installation of the tractor including a sensing arm, said four-cornered guide link system including lower guide means having a pivot axis, and means including approximately bow-shaped means operatively connecting said sensing means at said tractor coaxially with respect to said pivot axis, and clamping means detachably securing said sensing arm at said bow-shaped means, said clamping means including a support member adapted to be clamped to the center portion of said bow-shaped means, and means pivotally connecting said sensing arm to said support member including an abutment and spring means for urging said sensing arm against said abutment.

11. An installation for the automatic depth control of working implements operatively connected with a tractor by means of a quadrilateral guide linkage, comprising hydraulic means in said tractor adapted to selectively raise and lower the attached implement, sensing means operatively connected with said hydraulic means to selectively render the same operative to raise or lower the attached implement, said quadrilateral guide linkage including lower guide members having a pivot axis, and connecting means including approximately bow-shaped means for operatively connecting said sensing means with said tractor for turning movement about an extension of said axis, and sensing means being mounted on said bow-shaped means, said bow-shaped means including angularly bent leg portions, means pivotally mounting said angularly bent leg portions on said tractor for turning movement about said axis extension, said hydraulic means including power lift means having a control valve, an adjusting member operatively connected with one of said lower guide members of said quadrilateral guide linkage, said adjusting member transmitting the relative movement between said sensing means and said one of said lower guide members as measuring magnitude of the working depth to said control valve.

12. An installation for the automatic depth control of working implements operatively connected with a tractor by means of a four-cornered guide linkage, comprising hydraulic means in said tractor including lifter means adapted to selectively raise and lower the attached implement and control valve means for controlling said lifter means, sensing means for sensing the surface conditions of the ground passed over by the tractor, said four-cornered linkage having a plurality of guide means including lower guide members provided with a pivot axis, connecting means including an approximately bow-shaped member operatively connecting said sensing means with said tractor for turning movement relative to said tractor about an extension of said pivot axis, means adjustably securing said sensing means to said bow-shaped member, said connecting means further including means pivotally supporting said bow-shaped member on said tractor for turning movement about said axis extension, means connecting said sensing means with said control valve means, and adjusting means operatively connected between said sensing means and one of said lower guide members of said four-cornered linkage for transmitting a controlling movement to said control valve means such as to maintain the working depth of said implement in response to relative movement between said one of said lower guide members and said sensing means, said relative movement representing the measured magnitude of said working depth, said adjusting means including a lever operatively connected with said one of said lower guide members, said lever being pivotally supported on said tractor coaxially with said pivot axis and extending between said last-mentioned guide member and one of the leg portions of said bow-shaped member.

13. An installation for the automatic depth control of working implements operatively connected with a tractor by means of a four-cornered guide linkage, comprising hydraulic means in said tractor including lifter means adapted to selectively raise and lower the attached implement and control valve means for controlling said lifter means, sensing means for sensing the surface conditions of the ground passed over by the tractor, said four-cornered linkage having a plurality of guide means including lower guide means provided with a pivot axis, spaced pivot pins on said tractor coaxial with said axis, connecting means including an approximately bow-shaped member mounting said sensing means and operatively connecting said sensing means for turning movement in a path spaced from said pivot pins but coaxial therewith, the leg portions of said bow-shaped member being pivotally mounted on said spaced pivot pins, means connecting said sensing means with said control valve means, and adjusting means operatively connected between said sensing means and one of said guide means of said four-cornered linkage for transmitting a controlling movement to said control valve means such as to maintain the working depth of said implement in response to relative movement between said one of said guide means and said sensing means, said relative movement representing measured magnitude of said working depth, said adjusting means including a drag lever pivotally supported on one of said spaced pivot pins intermediate one of said leg portions of said bow-shaped member and the adjoining lower guide member of said four-cornered linkage, and means at said lever operatively connected with said bow-shaped member for transmitting said relative movement in dependence on said sensing means.

14. An installation for the automatic depth control of working implements operatively connected with a tractor by means of a four-cornered guide linkage, comprising hydraulic means in said tractor including lifter means adapted to selectively raise and lower the attached implement and control valve means for controlling said lifter means, sensing means for sensing the surface conditions of the ground passed over by the tractor, said four-cornered linkage having a plurality of guide means including lower guide means provided with a pivot axis, connecting means including an approximately bow-shaped member provided with means for supporting said sensing means and operatively connecting said sensing means for movement about an axial extension of said pivot axis, said tractor being provided with spaced pivot means coaxial with said axial extension, said bow-shaped member being pivotally mounted on said spaced pivot means, means connecting said sensing means with said control valve means and adjusting means operatively connected between said sensing means and one of said guide means of said four-cornered linkage for transmitting a controlling movement to said control valve means such as to maintain the working depth of said implement in response to relative movement between said one of said guide means and said sensing means, said relative movement representing measured magnitude of said working depth, said adjusting means including drag lever means provided with abutment means adapted to abut said bow-shaped member during lifting of the attached implement.

15. An installation for the automatic depth control of working implements operatively connected with a tractor by means of a four-corned guide linkage, comprising hydraulic means in said tractor including lifter means adapted to raise and lower the attached implement and control valve means for controlling said lifter means, said guide linkage having a plurality of guide means including lower guide means provided with a pivot axis, a bow-shaped member pivotally supported by said tractor on an axis coincident with said pivot axis, a sensing device supported on said bow-shaped member, adjusting means operatively connected with one of said lower guide means and with said sensing device, said adjusting means being operatively connected with said control valve means and being effective to transmit a controlling movement to said control valve means for maintaining the working depth of said implement in response to relative movement between said one of said guide means and said sensing means, said relative movement representing measured magnitude of said working depth.

16. An installation for the automatic depth control according to claim 15, wherein said adjusting means comprises a drag lever mounted on said tractor for pivotal movement about an axis coaxial with said pivot axis, said drag lever being disposed intermediate said last-mentioned one of said guide means and one of the leg portions of said bow-shaped member.

17. An installation for the automatic depth control according to claim 16, further comprising transmitting means for transmitting said controlling movement to said control valve means, said transmitting means including cooperating members, one of said cooperating members being secured to said bow-shaped member and the other of said cooperating members being pivotally secured to said drag lever.

18. An installation for the automatic depth control according to claim 17, wherein said tractor is provided with a stationary abutment and wherein said hydraulic means is provided with selecting lever means, said transmitting means including a pull cable assembly having a sleeve portion including said one of said cooperating members, said sleeve portion being secured between said abutment and said bow-shaped member, and a pull member pivotally secured to said selecting lever means, said pull member including said other of said cooperating members.

19. An installation for the automatic depth control according to claim 16, wherein said drag lever is provided with an adjustable abutment member engageable with said bow-shaped member during lifting of said attached implement.

20. An installation according to claim 16, wherein said hydraulic means includes a working cylinder and a reservoir, a pressure line interconnecting said cylinder with said reservoir, said control valve means comprising a throttle valve in said pressure line, and an adjusting linkage connecting said drag lever with said throttle valve.

21. An installation for the automatic depth control according to claim 20, wherein said throttle valve is constituted by a rotary valve pivotally connecting directly to one of the leg portions of said bow-shaped member.

22. An installation for the automatic depth control according to claim 20, further comprising shifting valve means in said pressure line between said working cylinder and said reservoir ahead of said throttle valve for selectively controlling the supply of pressure medium to said throttle valve in dependence upon the selected position of said shifting valve means.

23. An installation for the automatic depth control according to claim 22, wherein said shifting valve means is constituted by a pressure-limit valve adapted to be adjusted to different pressure which produces within the cylinder space of said working cylinder a counter pressure lying below the lifting force required to lift the attached implement.

24. An installation for the automatic depth control according to claim 15, wherein said sensing device includes a sensing arm, and clamping means for detachably clamping said sensing arm to said bow-shaped member to enable displacement thereof as well as adjustment in the height thereof.

25. An installation for the automatic depth control according to claim 24, wherein said sensing arm is pivotally supported about a pivot bolt and is tensioned against an abutment under the influence of a return spring.

26. An installation for the automatic depth control according to claim 9, further comprising means operatively connected with said drag lever and with said bow-shaped means for transmitting said relative movement which is controlled in dependence on said sensing means.

27. An installation for the automatic depth control according to claim 26, wherein said drag lever is provided with an adjustable abutment serving as entrainment member during withdrawal of the attached implements out of the ground.

28. An installation for the automatic depth control according to claim 27, wherein said hydraulic means includes a working cylinder and a reservoir, said transmission means including a pressure line provided with a throttle valve interconnecting said cylinder with said reservoir, said throttle valve being operatively connected with said drag lever to adjust the former by the latter.

29. An installation for the automatic depth control according to claim 28, wherein said throttle valve is constituted by a rotary slide valve pivotally connected directly at one of the leg portions of said bow-shaped means.

30. An installation for the automatic depth control according to claim 10, further comprising adjusting means for adjusting the height of said sensing arm in relation to said bow-shaped means.

References Cited in the file of this patent

UNITED STATES PATENTS

| | | |
|---|---|---|
| 2,616,350 | Robinson et al. | Nov. 4, 1952 |

FOREIGN PATENTS

| | | |
|---|---|---|
| 510,632 | Germany | Oct. 21, 1930 |
| 520,484 | Great Britain | Apr. 25, 1940 |
| 541,436 | Great Britain | Nov. 26, 1941 |